United States Patent
Warlimont

(10) Patent No.: US 7,097,754 B2
(45) Date of Patent: Aug. 29, 2006

(54) CONTINUOUS ELECTROFORMING PROCESS TO FORM A STRIP FOR BATTERY ELECTRODES AND A MANDREL TO BE USED IN SAID ELECTROFORMING PROCESS

(75) Inventor: Hans Warlimont, Freigericht (DE)

(73) Assignee: DSL Dresden Material-Innovation GmbH, Dresden (DE)

( * ) Notice: Subject to any disclaimer, the term of this patent is extended or adjusted under 35 U.S.C. 154(b) by 282 days.

(21) Appl. No.: 10/451,824

(22) PCT Filed: Jan. 16, 2002

(86) PCT No.: PCT/EP02/00356

§ 371 (c)(1),
(2), (4) Date: Aug. 6, 2003

(87) PCT Pub. No.: WO02/057515

PCT Pub. Date: Jul. 25, 2002

(65) Prior Publication Data

US 2004/0050707 A1    Mar. 18, 2004

(30) Foreign Application Priority Data

Jan. 22, 2001    (EP) ................... 01101356

(51) Int. Cl.
*H01M 10/44*    (2006.01)
*C25D 1/04*    (2006.01)

(52) U.S. Cl. .............. 205/76; 205/57; 205/67; 205/77; 204/198

(58) Field of Classification Search ............. 205/57, 205/63, 67, 75, 76, 77, 78; 204/198, 206
See application file for complete search history.

(56) References Cited

U.S. PATENT DOCUMENTS 1,567,079 A    12/1925    Porzel (Continued)

FOREIGN PATENT DOCUMENTS

EP    0 490 061    6/1992

(Continued)

*Primary Examiner*—Nam Nguyen
*Assistant Examiner*—Luan V. Van
(74) *Attorney, Agent, or Firm*—Jordan and Hamburg LLP

(57) ABSTRACT

A continuous electroforming process to form a strip for battery electrodes, comprising the steps of providing a mandrel having on its surface a reusable pattern subdivided into conductive and non-conductive areas; moving said mandrel through an electroforming bath to deposit a metal layer on said mandrel while it moves through the electroforming bath until the metal layer has assumed the shape of the conductive pattern and a thickness at least sufficient to provide strength for the layer to be removed from said mandrel; and separating said layer from said mandrel; is characterised by moving said strip through at least one subsequent bath in which electrodeposition of metal takes place on both sides of said strip while it is moved through said subsequent bath, applying a current density of at least 10 A/dm2 and up to 300 A/dm2 to the conductive surface of the moving mandrel and to the metal surface of the strip in each of the subsequent baths; and directing a forced flow of electrolyte onto the surface of the layer and said strip, wherein the reusable conductive pattern of the surface of the mandrel takes the form of at least one battery electrode and the electrolyte contains additives providing increased hardness, increased corrosion resistance and being suited specifically to permit combining a high rate of deposition with controlled surface roughness and controlled composition of the deposit.

20 Claims, 1 Drawing Sheet

U.S. PATENT DOCUMENTS

Figure 1:
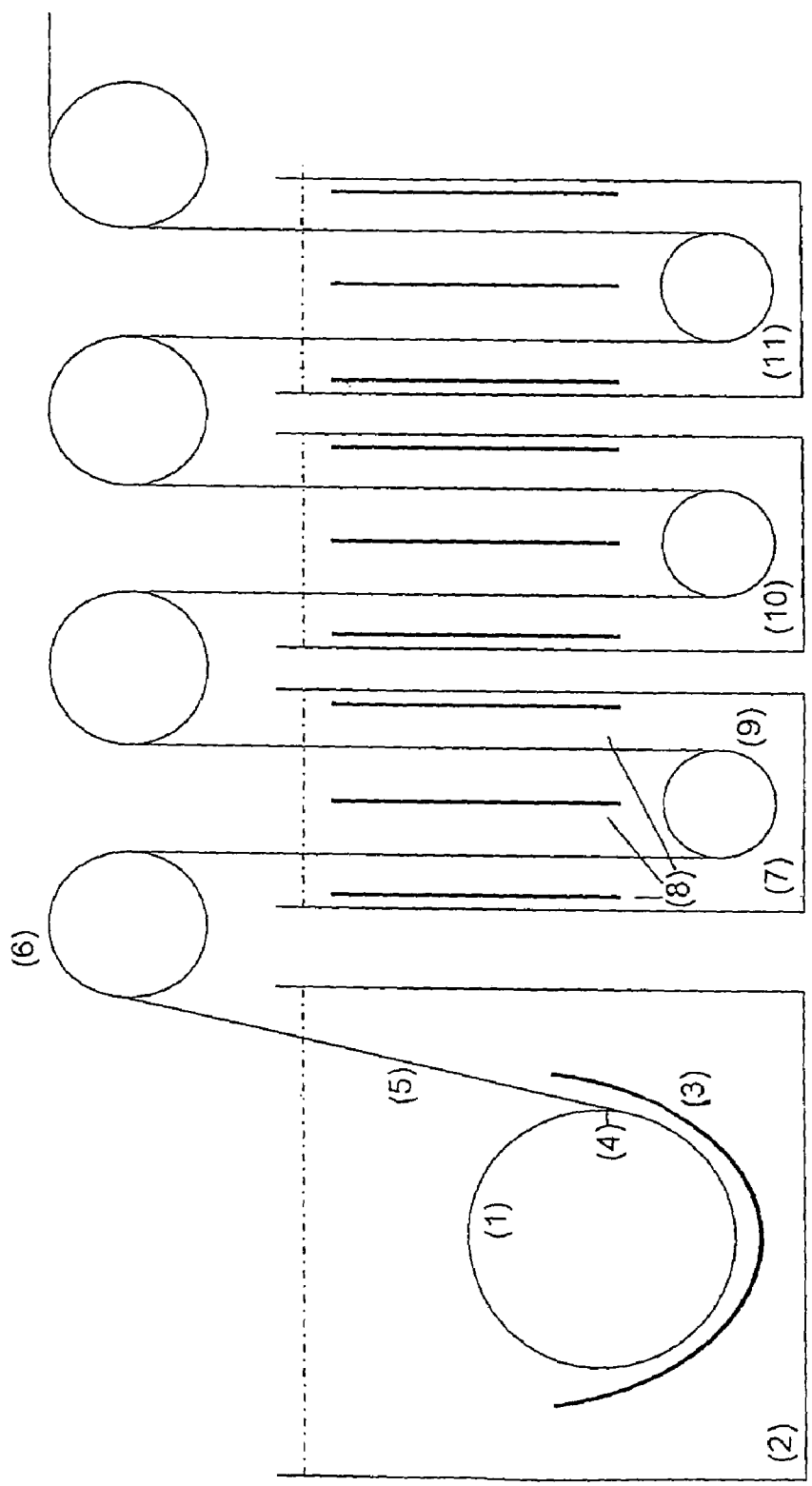

| | | | |
|---|---|---|---|
| 2,563,360 A | * | 8/1951 | Clifton et al. .............. 205/239 |
| 3,818,926 A | * | 6/1974 | Wohlwend .................. 137/101 |
| 3,985,630 A | * | 10/1976 | Ginatta ....................... 205/544 |
| 4,169,018 A | | 9/1979 | Berdan et al. |
| 4,529,486 A | * | 7/1985 | Polan .......................... 205/77 |
| 5,215,645 A | * | 6/1993 | DiFranco et al. ............. 205/77 |
| 5,236,572 A | | 8/1993 | Lam et al. |
| 5,565,079 A | * | 10/1996 | Griego ........................ 205/67 |

FOREIGN PATENT DOCUMENTS

| | | |
|---|---|---|
| GB | 2 243 618 | 11/1991 |

\* cited by examiner

CONTINUOUS ELECTROFORMING PROCESS TO FORM A STRIP FOR BATTERY ELECTRODES AND A MANDREL TO BE USED IN SAID ELECTROFORMING PROCESS

BACKGROUND OF THE INVENTION

The invention relates to a continuous electroforming process to form a strip for battery electrodes, comprising the steps of providing a mandrel having on its surface a reusable pattern subdivided into conductive and non-conductive areas; moving said mandrel through an electroforming bath to deposit a metal layer on said mandrel while it moves through the electroforming bath until the metal layer has assumed the shape of the conductive pattern and a thickness at least sufficient to provide strength for the layer to be removed from said mandrel; and separating said layer from said mandrel. The invention further relates to a mandrel to be used in the electroforming process. The present invention is concerned specifically with the continuous production of electrodes, preferentially in foil and grid form, by electroforming, and with obtaining products of specified optimal properties.

DE 44 04 817 C1 describes a process to manufacture battery grids by electroforming. However, the discontinuous process claimed there is limited to a production of individual grids on a plate-shaped cathode. Such a process is difficult to control and is not sufficiently economical. Furthermore, modern technology of battery plate production has changed over to a continuous process. It requires that the electrodes are provided in the form of an "endless" strip-shaped feed material of electrodes connected to each other. Any new process which is to provide competitive or superior productivity and product properties will have to satisfy the requirements of the continuous plate making process.

Electrodeposition processes to produce metal continuously as a strip in sheet or foil form have been known for a long time.

U.S. Pat. No. 1,567,079 discloses a continuous electrolytic process of forming sheet cathodes comprising the initial formation of a single sheet cathode on a horizontally moving, vertically disposed surface in a winding direction, then parting the cathode from the moving surface in an unwinding direction without interrupting the electrodeposition, then interrupting the deposition and then continuing the deposition upon the initially formed cathode, as it is moved horizontally in a vertical plane, whereby a plurality of sheet cathodes will be formed upon the surface of the cathode initially formed.

DE 585 633 uses a horizontal cylinder in a similar process.

DE 197 38 513 C1 relates to a process for producing a metal foil consisting of plural metals where different electrolyte baths are used.

U.S. Pat. No. 4,169,018 discloses a process for electroforming thin copper foil on aluminum carrier material for use in printed circuits wherein a continuous strip of aluminum material is prepared by etching and rinsing steps, whereupon the prepared carrier material is passed through a single preselected composition copper plating bath having nitrate ions in the concentration of between 3 and 30 grams/liter and fluoride ions in the concentration of between 0.05 and 10 grams/liter. This bath is operated at a constant, predetermined cathode current density of between about 5.5 and 33 A/dm$^2$ (50 and 300 A/foot$^2$).

U.S. Pat. No. 5,236,572 which has been used to formulate the preamble part of patent claim 1 discloses a method for continuously manufacturing parts requiring precision microfabrication. A surface of a mandrel having a reusable pattern thereon is moved through an electroforming bath. While the mandrel surface moves through the bath, a metal layer is deposited on the mandrel surface to define a pattern. After the metal layer has been deposited to the selected thickness, the metal layer is separated from the mandrel surface.

SUMMARY OF THE INVENTION

It is the object of the invention to provide a continuous electroforming process of high productivity and flexibility which satisfies the economical and technical demands for the product.

The aim of the invention is to achieve a high rate of formation and, thus, a more economical process, and moreover a more highly optimized product than that obtained by previous technology. Such an optimized product is obtained because the process provides a high degree of flexibility in producing electrodes of different design, different layered composite structure and different surface structure.

The process moving said strip through at least one subsequent bath in which electrodeposition of metal takes place on both sides of said strip while it is moved through said subsequent bath, applying a current density of at least 10 A/dm$^2$ and up to 300 A/dm$^2$ to the conductive surface of the moving mandrel and to the metal surface of the strip in each of the subsequent baths; and directing a forced flow of electrolyte onto the surface of the layer and said strip, wherein the reusable conductive pattern of the surface of the mandrel takes the form of at least one battery electrode and the electrolyte contains additives suited specifically to permit combining a high rate of deposition with controlled surface roughness and controlled composition of the deposit.

Preferably, the current density is specified to induce a surface roughness in the range of $R_a=3$ μm to $R_a=100$ μm according to ISO 4287. Preferred current density ranges are from at least 20 A/dm$^2$ to 300 A/dm$^2$ and further preferred from at least 40 A/dm$^2$ to 300 A/dm$^2$.

In its simplest embodiment, only one subsequent bath is provided, however, it is possible to add further subsequent baths and to modify the electrolyte in each of said subsequent baths and the deposition conditions according to a desired layer structure to form multi-layer products. Hardening dispersoid particles can be added to the electrolyte in said first bath and/or in said subsequent baths. Further, alloying elements can be included in the electrolyte of the subsequent baths to provide corrosion resistance and additional hardening to the layers formed therein.

The additives are selected from the polyaromatic/aliphatic class containing one or more oxo- and/or hydroxy- and/or keto-groups per molecule. The molecular mass of the additives may be in the range of about 300 to 1,000. The aliphatic chain should contain at least 4 to 8 C-atoms. It is preferred that the electrolyte contains a combination of at least two additive different substances with different molecular weight and polarity.

In the field of electrode position different types of additives, as referred to above, are applied such as dispersoid particles serving to harden the electrodeposited structure, further alloying elements serving to improve the corrosion resistance and/or hardness, and additives in a narrower sense which control the surface, microstructure and the incorporation of the other additives.

An essential feature of the invention is the provision of a forced flow of electrolyte onto the surface of the layer on the mandrel and the strip. The forced flow can be generated by forcing the electrolyte through a multitude of nozzles onto the surface of said mandrel or the layer on the mandrel, respectively, and onto the surface of the strip.

A specific mandrel should be used in the process of the invention which advantageously comprises the shape of a cylinder. A conductive pattern is provided on the surface of the mandrel which may consist of a conductive surface between parallel-sided isolating borders along the circumference of the cylinder. The conductive pattern may, alternatively, have the structure of an electrode, preferably a battery grid, similar to that described in DE 44 04 817 C1, or the structure of a current optimized grid design. It is further preferred to structure the conductive area of the surface of the mandrel also in the direction normal to the surface to form grooves, hillocks or the like which are transferred to the product during the forming process.

It is also preferred to use in the process of the invention anodes in any of the baths that consist of lead scrap or of remelted lead scrap. Thereby, refining of the lead is advantageously combined with the production of battery electrodes as an immediate combination of two process steps which normally would be performed separately. An inventive step is even seen in this novel combination.

The invention will now be further explained with reference to the accompanying drawing.

IN THE DRAWINGS

FIG. 1 schematically shows an apparatus with which the continuous electroforming process of the invention can be carried out.

DESCRIPTION OF THE PREFERRED EMBODIMENTS

The figure only shows the major parts of the apparatus. A mandrel 1 which is structured on its surface into a pattern of conductive and non-conductive areas, according to the design of the electrode shaped to be produced, is used as the cathode of an electrodeposition bath 2 with an anode 3. While the mandrel 1 is rotating, the metal deposite is forming and growing in thickness. After having reached sufficient resistance against tearing, corresponding to a specified thickness of the layer on the surface of mandrel 1, the layer is separated at a position 4 in strip shape 5 and is guided by guide and contact rolls 6 into the first subsequent bath 7 with anodes 8 and a submerged guide roll 9. Further subsequent baths such as 10, 11 essentially have the same parts.

The process permits to produce electrodes with low thickness, e.g. 50 to 500 μm, which are porefree and fully optimized in design and properties.

EXAMPLE

To produce battery grids having a size of 15 cm×15 cm and a grid area fraction of 50% of the grid size, the surface of a cylinder serving as the mandrel having a diameter of 1 m and a length of 1.2 m is provided with conductive areas corresponding to the grid structure. The cylinder is submerged into an electrolyte as disclosed in DE 44 04 817 C1 and rotates with a circumferential velocity of 106.8 m/h. The electrodeposition occurs at the surface of the cylinder at a current density of about 80 A/dm². A lead grid strip forms on said cylinder and is separated therefrom upon reaching a layer thickness of 80 μm. Subsequently the strip is transferred to a second electrolyte bath having an effective length of 33 m and is brought to the desired final thickness of 0.5 mm by electrodeposition on both surfaces of the strip at a current density of 20 A/dm². The production rate is 95 grids per minute.

The features disclosed in the foregoing description, in the claims and/or in the accompanying drawing may, both separately and in any combination thereof, be material for realising the invention in diverse forms thereof.

The invention claimed is:

1. A continuous electroforming process to form a strip for battery electrodes, comprising the steps of:

providing a mandrel having a surface with a reusable pattern subdivided into conductive and non-conductive areas so as to define a conductive pattern;

moving said mandrel through an electrolyte of an electroforming bath to deposit a metal layer on said mandrel while moving through the electroforming bath until the metal layer has assumed a shape of the conductive pattern and a thickness at least sufficient to provide strength for the layer to be removed in strip form from said mandrel;

separating said layer from said mandrel and removing said layer in moving strip form from said electroforming bath while said mandrel is moving to produce a moving strip that moves continuously;

receiving said moving strip from said electroforming bath and passing said moving strip while continuously moving through at least one subsequent bath of an electrolyte in which electrodeposition of metal takes place on both sides of said moving strip while it is moved through said subsequent bath;

applying a current density of at least 10 A/dm² and up to 300 A/dm² to the conductive surface of the moving mandrel and to the moving strip in each of the at least one subsequent bath; and directing a forced flow of electrolyte onto the surface of the layer and said strip, wherein the reusable conductive pattern of the surface of the mandrel takes a form of at least one battery electrode and the the electrolytes of the electroforming bath and the at least one subsequent bath containing additives suited specifically to permit combining a high rate of deposition with controlled surface roughness and controlled composition of deposited material.

2. The process according to claim 1, wherein the metal layer includes lead and the current density is set to induce a surface roughness in a range of Ra=3 μm to Ra=100 μm according to ISO 4287.

3. The process according to claim 1 or 2, further comprising:

said at least one subsequent bath including subseauent baths; and modifying the electrolyte and the deposition conditions in each of said subsequent baths according to a desired layer structure to form multilayer products.

4. The process according to claims 1 or 2, further comprising supplying hardening dispersoid particles to the electrolyte in said electroforming bath.

5. The process according to claim 3, further comprising providing alloying elements in the electrolyte of said subsequent baths to provide corrosion resistance to the layers formed therein.

6. The process according to claim 3, further comprising supplying hardening additives to the electrolyte in said subsequent baths.

7. The process according to claims 1 or 2, further comprising selecting said additives from the polyaromatic-aliphatic class containing one or more oxo- and/or hydroxy- and/or keto-groups per molecule.

8. The process according to claim 7 wherein a molecular mass of the additives is between 300 and 1000.

9. The process according to claim 7, where an aliphatic chain of the additives contains at least 4 to 8 C-atoms.

10. The process according to claims 1 or 2, wherein the additives include a combination of at least two different additives with different molecular weight and polarity.

11. The process according to claims 1 or 2, wherein the current density applied is in a range from at least 20 A/dm$^2$ to 300 A/dm$^2$.

12. The process according to claims 1 or 2, where in the current density applied is in a range from at least 40 A/dm$^2$ to 300 A/dm$^2$.

13. The process according to claims 1 or 2, wherein the directing the forced flow of the electrolyte includes forcing the electrolyte through a multitude of nozzles onto the surface of said mandrel.

14. The process according to claims 1 or 2, wherein the directing the forced flow of the electrolyte includes forcing the electrolyte through a multitude of nozzles onto the surface of said strip.

15. The process according to claim 1 or 2, wherein the surface of the mandrel has a shape of a cylinder.

16. The process of claim 15, wherein:

the mandrel is a rotatable cylinder having a surface that is cylindrical;

the surface has a reusable pattern subdivided into conductive and non-conductive areas so as to define a conductive pattern;

the conductive pattern has a conductive surface between parallel-sided isolating borders along a circumference of said cylinder.

17. The process mandrel according to claim 16, wherein the conductive pattern is configured to form a battery grid.

18. The process as claimed in claim 16, wherein the conductive area of the surface of said mandrel is structured in a direction normal to the surface to form at least one Qf grooves or hillocks which are transferred to the metal strip during a forming process.

19. The process according to claim 1 or 2, in which any of anodes in any of the electroforming bath and the at least one subsequent bath is formed of lead scrap.

20. The process according to claim 1 or 2, in which any of the anodes in any of the electroforming bath and the at least one subsequent bath is formed of remelted lead scrap.

* * * * *